(12) United States Patent
Nassor

(10) Patent No.: US 6,275,982 B1
(45) Date of Patent: Aug. 14, 2001

(54) METHOD AND DEVICE ENABLING A FIXED PROGRAM TO BE DEVELOPED

(75) Inventor: Azadali Nassor, Villepreux (FR)

(73) Assignee: CP8 Transac, Louveciennes (FR)

( * ) Notice: Subject to any disclaimer, the term of this patent is extended or adjusted under 35 U.S.C. 154(b) by 0 days.

(21) Appl. No.: 08/981,607
(22) PCT Filed: Apr. 29, 1997
(86) PCT No.: PCT/FR97/00759
§ 371 Date: Dec. 29, 1997
§ 102(e) Date: Dec. 29, 1997
(87) PCT Pub. No.: WO97/41510
PCT Pub. Date: Nov. 6, 1997

(30) Foreign Application Priority Data

Apr. 30, 1996 (FR) .................................................. 96 05454

(51) Int. Cl.⁷ .................................................. G06F 9/445
(52) U.S. Cl. .................. 717/5; 717/2; 717/3; 717/4; 717/6; 711/103; 711/104; 711/105
(58) Field of Search ............................ 395/702, 703, 395/704, 705, 706; 717/5; 711/103, 104, 105

(56) References Cited

U.S. PATENT DOCUMENTS

| | | | |
|---|---|---|---|
| 5,202,923 | 4/1993 | Kuriyama | 380/50 |
| 5,241,634 | 8/1993 | Suzuki . | |
| 5,448,578 * | 9/1995 | Kim | 714/766 |
| 5,465,349 * | 11/1995 | Gernimi et al. | 714/30 |
| 5,542,081 | 7/1996 | Geronimi | 395/800 |
| 5,625,791 * | 4/1997 | Farrugia et al. | 711/106 |
| 5,644,539 * | 7/1997 | Yamagami et al. | 365/200 |
| 5,682,031 * | 10/1997 | Gernimi | 235/492 |
| 5,812,809 * | 9/1998 | Matsuo et al. | 395/388 |
| 5,829,013 * | 10/1998 | Hasbun | 711/103 |
| 5,901,330 * | 5/1999 | Sun et al. | 711/103 |

FOREIGN PATENT DOCUMENTS 2667417   4/1992  (FR) .

OTHER PUBLICATIONS

IBM Technical Disclosure Bulletin, vol. 35, No 1B, Jun. 1, 1992, pp. 455–456, XP000309137, "Software Technique to Call for the Cleaning of Air Filters by Monitoring Power–on Hours".

* cited by examiner

Primary Examiner—Mark R. Powell
Assistant Examiner—Ted T. Vo
(74) Attorney, Agent, or Firm—Miles & Stockbirdge P.C.; Edward J. Kondracki

(57) ABSTRACT

The present invention relates to a device and process for executing code sequences in a support comprising an integrated circuit (10) capable of executing code sequences, as well as a first memory (12) containing a main program and possibly other code sequences executable by the integrated circuit, a second nonvolatile programmable memory (11) possibly containing code sequences executable by the integrated circuit, and a third working memory (14), characterized in that an orientation table contained in the second memory (11) contains at least one field containing a code reference data element of first means (INS_INT) which make it possible to verify the presence of a code reference, to store in working memory the address data element associated with the code reference and to set a trap indicator DI, and of second means (INS_ORT) which make it possible to test the trap indicator DI, and to execute the jump to the address indicated by the contents of the working memory AD_SAUT. The device and process enable a fixed program in a portable device such as a microprocessor card to be changed.

11 Claims, 6 Drawing Sheets

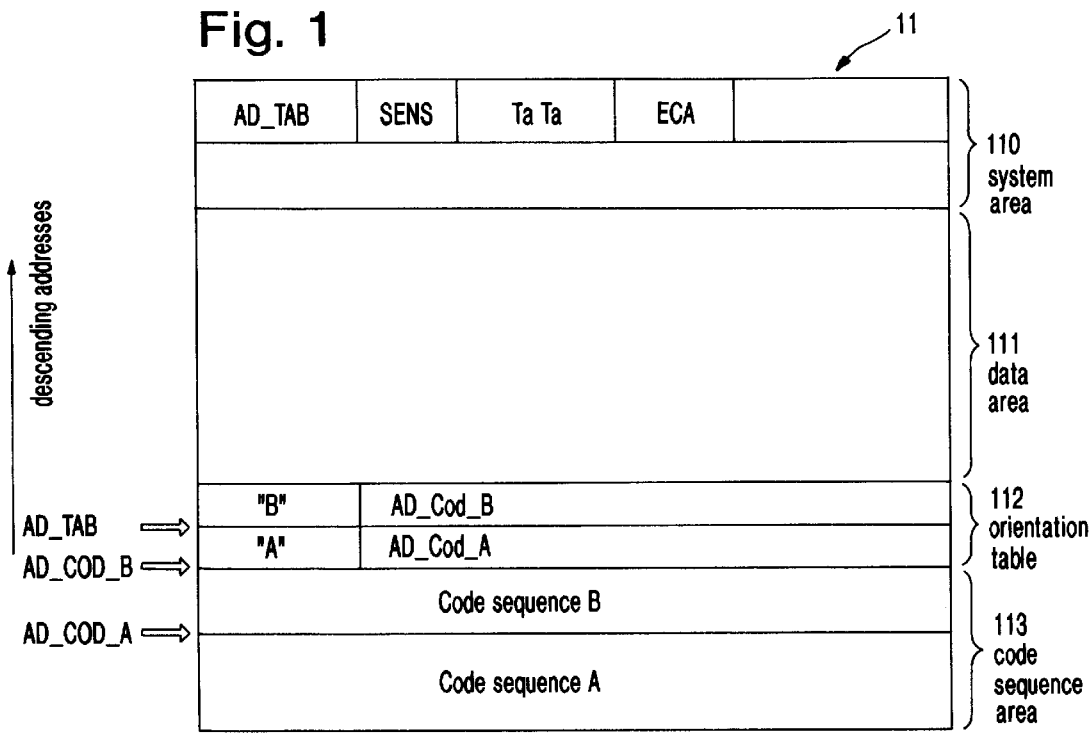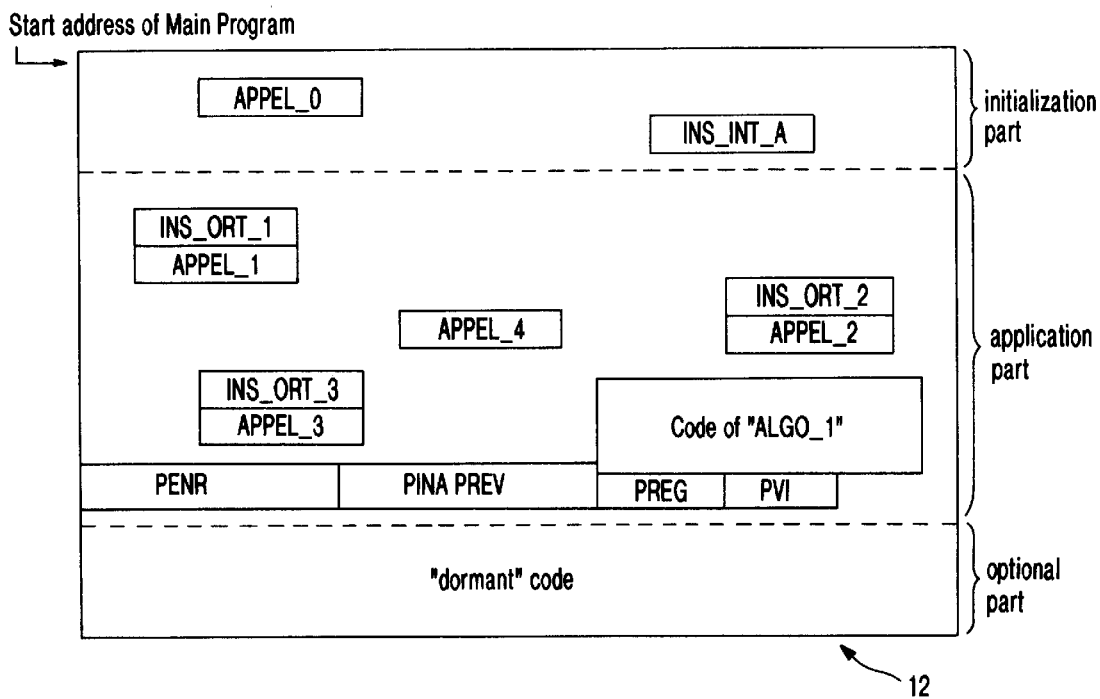

METHOD AND DEVICE ENABLING A FIXED PROGRAM TO BE DEVELOPED

BACKGROUND OF THE INVENTION

The present invention relates to computer programs, particularly those incorporated into microcircuit supports, and more generally portable objects equipped with integrated circuits comprising at least one central processing unit, one read-only program memory, one nonvolatile programmable memory and one working memory. This nonvolatile memory is capable of storing data and code, and the central processing unit executes this code.

DESCRIPTION OF RELATED ART

At the present time, it is known to have two very different types of programs coexisting in the same object, one of which is written into the integrated circuit upon fabrication and cannot be modified, the other of which is input from the outside during normal utilization of the object, as necessary.

At this time, microcircuit supports are technically capable of meeting numerous needs. However, the production of a "mask," that is, the program in ROM memory, is still very expensive, and this cost discourages many "small" customers who would be interested in purchasing a few thousand cards. One solution would consist of using an existing mask and adding the functions requested by the client into the programmable memory.

The capability to input and execute additional code in programmable memory offers the advantage of being able to easily add new functions to an existing program or to adapt this program to specific needs.

French patent 2 655 170 which corresponds to U.S. Pat. No. 5,202,923; describes a portable electronic device capable of writing code sequences into a nonvolatile memory. The nonvolatile programmable memory comprises a specific part configured for the purpose of containing code sequences, which part is itself divided into an indicator area, a code sequence data area, and a block check character area. A test instruction is implemented in the program in read-only memory in order to read and test the indicator area, and if possible to execute the jump. Therefore, there must be a test instruction and an allocated storage area in programmable memory corresponding to each jump.

Also known, from French patent 2 667 417, is a microprocessor card designed to receive multiple programs into programmable memory wherein so-called filtering instructions are associated with each of the reserved locations in programmable memory so as to constitute a means for storing the address of the code of an instruction subroutine accessible by executing the filtering instruction stored in the read-only memory of the card. Each filtering instruction must know the address of the storage area containing the address of the associated code in the programmable memory, which imposes a hierarchy of access that is permanently fixed.

The two solutions described above have the following drawbacks.

One skilled in the art wishing to implement several jump instructions must multiply the jump instructions in the program in read-only memory and the specific areas in programmable memory. If a large number of instructions of this type must be installed into the main program, the total space they occupy in read-only memory becomes substantial, to the detriment of the program space. Moreover, in the nonvolatile programmable memory, even if the subroutine is not written, its space is reserved as is that of the indicators, which takes up a substantial amount of space unnecessarily. Finally, once written, the subroutine cannot be modified. In short, this solution is only suitable for a limited number of jump instructions and a few subroutines, and does not in any way solve the problem of a substantial number of jumps and subroutines.

The subject of the present invention is a process and a device allowing the functionalities of a chip card to be changed without the drawbacks of the patents cited, particularly by allowing a larger number of calls to subroutines. In effect, the device according to the invention offers the advantage of being easy to implement in a program, of using very little code memory, of minimizing the memory size used, of being dynamic and allowing all kinds of modifications, or of optimizing the execution time.

SUMMARY OF THE INVENTION

For this reason, the device for executing code sequences in a support comprising an integrated circuit capable of executing code sequences, as well as a first memory containing a main program and possibly other code sequences executable by the integrated circuit, a second nonvolatile programmable memory possibly containing code sequences executable by the integrated circuit, and a third working memory, is characterized in that an orientation table contained in the second memory contains at least one field containing a code reference data element of first means (INS_INT) which make it possible

- to verify the presence of a code reference,
- to store in working memory the address data element associated with the reference of the code and to set a trap indicator DI, and of second means (INS_ORT) which make it possible
- to test the trap indicator DI, and
- to execute the jump to the address indicated by the contents of the working memory.

According to another characteristic, the address data element of a code sequence contained in one of the three memories associated with the code reference is calculated from the code reference.

According to another characteristic, a second field contains the address data element of a code sequence contained in one of the three memories.

According to another characteristic, the device comprises, in a possibly protected area of the programmable memory, a data element defining the first address and possibly the search direction for the first verification means.

According to another characteristic, the orientation table comprises an additional field indicating the next address in the table where the information corresponding to the next code reference is located.

According to another characteristic, the orientation table comprises an additional field which makes it possible to verify the integrity of the preceding fields and/or of the attached code sequence in comparison with the result supplied by a checksum calculating means.

According to another characteristic, the second means comprise means for storing in working memory an address to return to after a jump when a plurality of second means are available to execute a jump directed to the same sequence address.

According to another characteristic, the device comprises means CAI for preventing the writing of additional code, and means RCI for preventing a regeneration of the card.

Another object is to offer a process for recording new functionalities.

This object is achieved due to the fact that the process for writing a new code in a device as described herein, is characterized in that it is comprised of receiving a write command;

verifying the presence of a first field constituting the code reference A, B, C, etc., and a second field representing the address AD_Cod_A, AD_Cod_B, AD_Cod_C, etc., associated with the code reference;

verifying that the value of the first address constituting the orientation table address AD_TAB is consistent;

verifying that no flag ECA is active;

checking that the reference supplied by the first field does not exist in the table;

setting the flag ECA in the protected area of programmable memory to the active state;

receiving and writing the information corresponding to the new code;

verifying that the operation has been executed correctly and updating the orientation table;

setting the flag ECA to the inactive state.

According to another characteristic, the operation for updating the table comprises a writing of the next address field in the orientation table with the address corresponding to the orientation word of the code which precedes the code written.

BRIEF DESCRIPTION OF THE DRAWINGS

Other characteristics and advantages of the present invention will appear more clearly with a reading of the following description of an exemplary embodiment of the device and implementation of the process, illustrated with the aid of the appended figures, in which:

FIG. 1 represents a partition of the programmable memory of the card using a variant of a process for managing the orientation table;

FIG. 2 represents an example of a partition of the read-only memory of the card;

DESCRIPTION OF THE PREFERRED EMBODIMENTS

Figure 11:
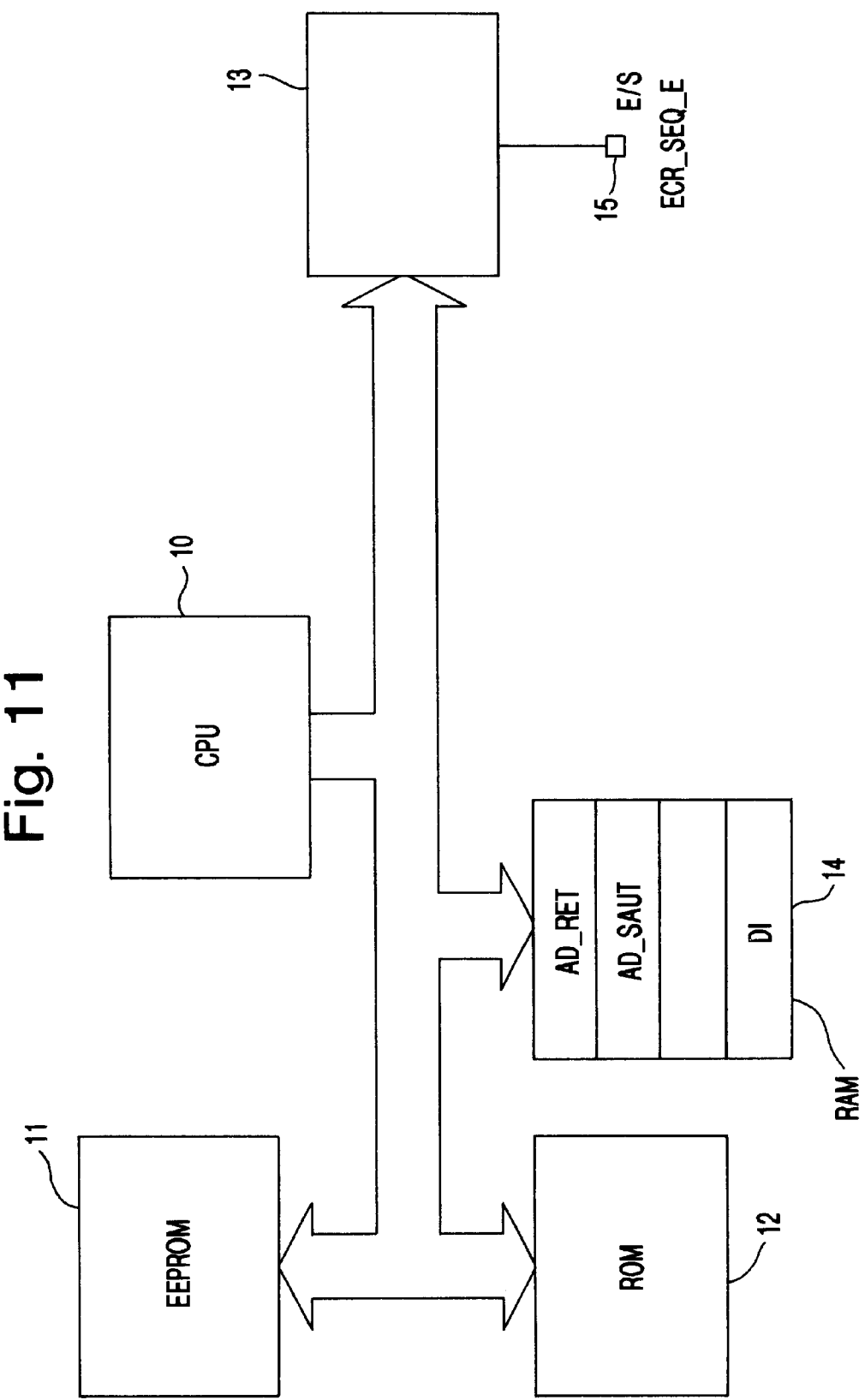
FIG. 11 represents the elements constituting a microcircuit support required for implementing the device and the process of the invention.

The invention will be more clearly understood through the description of the exemplary utilization below, in a microprocessor card according to FIG. 11.

A microprocessor card has a Central Processing Unit (10) of the microprocessor or integrated circuit type capable of executing instruction sequences, a working memory RAM (14), a nonvolatile memory ROM (12) containing the main program, a nonvolatile memory (11) EPROM, EEPROM or FRAM programmable and executable by the CPU containing data, and input-output devices (13) which allow dialoguing with a reader through a link (15) with or without contact. The program is burned into ROM during the fabrication of the component and cannot be subsequently modified.

The programmable memory (11) is divided into several parts, as shown in FIG. 1. A first part (110) marked system area contains system information that is not readable from the outside, making it possible to check the validity (authenticity and/or integrity) and the location of the information or data group contained in the rest of the memory (pointers, etc.). A second part (111) marked data area is accessible from the outside and is used to store user data. A third part (112) marked orientation table contains the orientation table, the latter being formed of identical elements, each element containing several fields, including two main fields: the first is a code reference data element "A", "B", etc., and the second is the start address AD_Cod_A, AD_Cod_B, etc., of the corresponding code sequence stored in a fourth part (113) of the memory. The fourth area marked code sequence area contains the code sequences that can be called by the main program. It must be noted that in a variant of the invention the orientation table or the code sequence can be loaded into working memory (RAM) instead of EEPROM.

The start address of the orientation table, called AD_TAB, is stored in the system area; a second data element marked SENS determines the direction in which the pointer reads this table, either in the direction of the ascending addresses, or in the direction of the descending addresses. Thus, the addresses of the values AD_TAB and SENS can be the only data relative to the invention that the program in ROM knows. It can also be useful to store the size in octets or the maximum number of elements (Ta Ta) of the orientation table.

The following is an example which illustrates the advantage of the trapping process according to the invention. The main program can contain an algorithm such as D.E.S. (Data Encryption Standard) capable of carrying out the encryption/decryption of information or certain authentication functions. It can be advantageous to replace this algorithm with another one, or to completely change its implementation, for example in order to make it faster. The code of the algorithm constitutes a block in the ROM memory of the Operating System; this code cannot be modified, and it can be called from various points in the main program.

The example will be more clearly understood by examining FIG. 2. The ROM memory, which among other things contains the main program, is divided into three parts. The first part implements the initialization of the card after powering up: the testing of the working memory, the reading of the status of the card, and the sending of the octets of the response to the RESET. The second part contains the application program which executes the various commands requested by the terminal (the first code part is always executed before the second). The first and second parts constitute the main program. The third part contains the "dormant" code whose role is explained below.

The algorithm called ALGO_1 whose operation is intended to be modified is contained in the application part.

In the example, this algorithm is called from five different points in the code. The new algorithm has been pre-loaded into the code sequence area in the programmable memory and the orientation table has been updated; the execution address of its code sequence is AD_Cod_A.

At the power up, the main program executes the initialization part, wherein the first jump to ALGO_1 marked "APPEL_0" is found; no trap is provided for, so this jump is not conditioned by any trap instruction. Also found in this part is the interrogation instruction sequence INS_INT_A, which the programmer has been careful to implement in this part so as to be sure to execute it at least once before the execution of the program of the application part. In the example, the code reference associated with this interrogation instruction sequence is "A", and it is written into the main program. During a first period, the interrogation instruction searches in the system area for the orientation table address AD_TAB. Then, starting at this address and proceeding in the direction of the ascending or descending addresses depending on the value of "SENS", each element of the table is read. The value of the first fields corresponding to the code references is compared to the value "A". If the value A is found in a first field of the orientation table, the value of the second corresponding field (AD_Cod_A) is read and stored in the register AD_SAUT in working memory (RAM) and a trap indicator (DI) in working memory is set to the active position.

Figure 3:
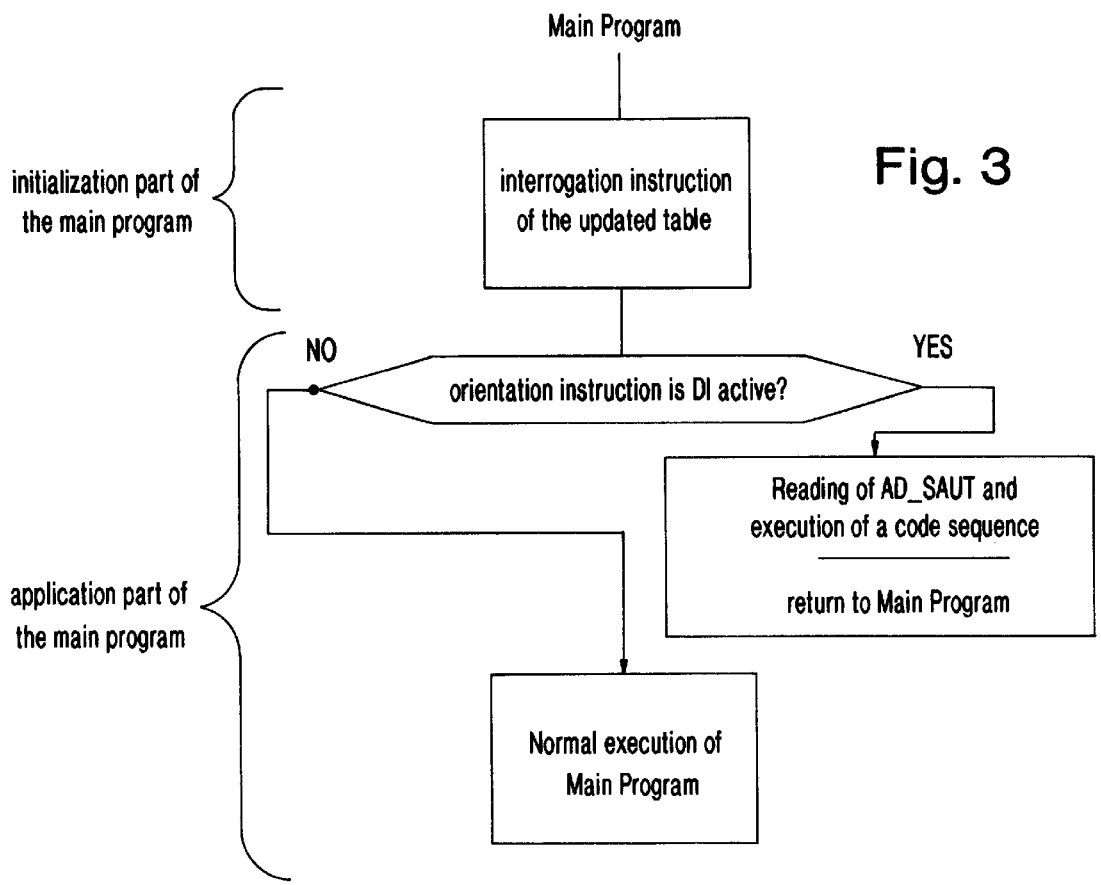
FIG. 3 represents, in a main program, an example of an interrogation instruction sequence executed during the running of the main program and a subsequent orientation instruction sequence.

The subroutine ALGO_1 is called five times by APPEL_0, APPEL_1, ..., APPEL_4, in the main program when DI is not active. For APPEL_1, APPEL_2, and APPEL_3, the trap to another program ALGO_2, which can be in read-only memory or in programmable memory, is executed when the trap indicator DI is active, since the programmer has been careful to implement in the code of the main program an orientation instruction INS_ORT_1, INS_ORT_2 and INS_ORT_3 before each jump APPEL_1, APPEL_2, APPEL_3 effective in ALGO_1. As shown in FIG. 3, the orientation instruction is comprised, first of all, of testing whether the trap indicator DI is active. If the indicator is inactive, the main program follows its normal course and executes the algorithm in ROM, for example by executing the jump APPEL_1 to ALGO_1. If the trap indicator DI is active, the orientation instruction traps the program to the address indicated by the contents of the register AD_SAUT. The value AD_Cod_A previously stored in the register AD_SAUT is loaded into the program counter of the Central Processing Unit, and the code sequence at the loaded address is executed. On the other hand, if desired by the programmer, the subroutine ALGO_1 can be called by APPEL_4 without the possibility of a trap, since no orientation instruction is associated with it.

It must be noted that the expressions interrogation instruction and orientation instruction are actually macroinstructions constituted by a set of elementary instructions executable by the central processing unit.

The same orientation instruction can be executed an unlimited number of times, as long as the indicator remains active; the jump will always go to the address stored in AD_SAUT. Likewise, as shown in FIG. 2, a plurality of orientation instructions INS_ORT_1, INS_ORT_2, INS_ORT_3 with the same code reference "A" can be implemented in the main program; their execution will have the same effect. In this case, it is appropriate to examine the return address to the main program very carefully; exemplary embodiments of return instructions will be explained below.

As a general rule, the programmer make sure that at least one interrogation instruction sequence is executed before each orientation instruction. If the code sequence must not be run more than once, an instruction for clearing the trap indicator DI, in order to render the trap indicator DI inactive, is executed by the code sequence. Thus, once there has been a return to the main program, no further trap can be carried out during the subsequent orientation instructions.

In light of this example, the first advantage of separating the interrogation and orientation instruction sequences is apparent. The interrogation instruction sequence, which is more elaborate and hence more costly in terms of code, is loaded into the program only once. The orientation instruction sequences, which are very short and not very costly in terms of memory space, are loaded as necessary, resulting in an increase of space in the program memory.

The trap indicator DI can effectively be replaced by a particular value of the register AD_SAUT. If the register AD_SAUT contains the value "NULL", which is not a significant address value of the nonvolatile memory for a given component, it means that there is no trap of the main program to be carried out. Likewise, if the content of the memory AD_TAB is a value that is not consistent with the initial value of the orientation table (for example, "NULL"), it may be presumed that no sequence is available and that consequently no trap is intended.

Figure 4:
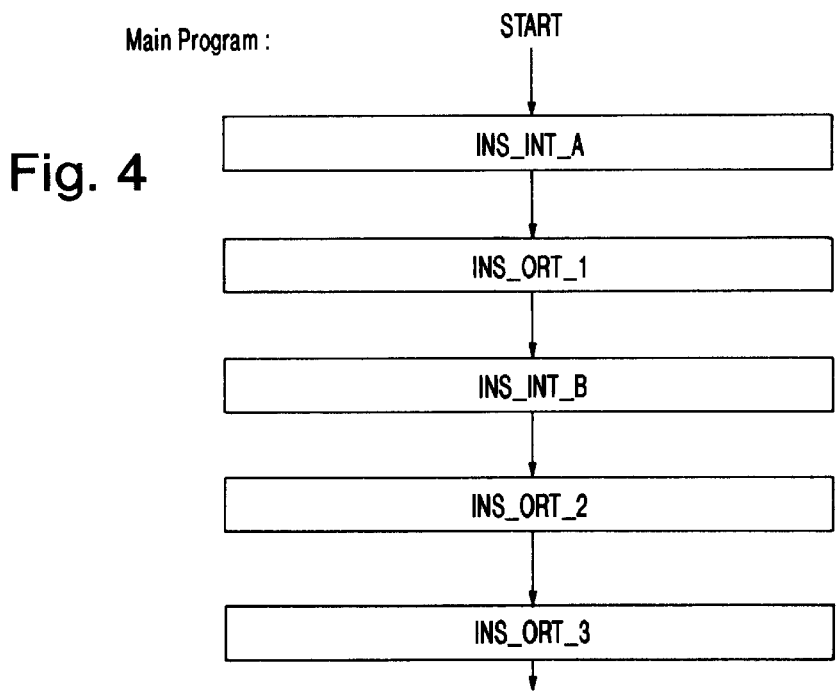
FIG. 4 represents an example of a sequence of possible interrogation and orientation instructions.

As shown in FIG. 4, a plurality of interrogation instructions (INS_INT_A, INS_INT_B) can be input into the main program. Each of these instructions has its own reference code written into the programmable memory, and searches for the presence of this code among the initial values of the orientation table in programmable memory. If the value of this code is in fact in the table, the address of the associated code sequence is entered into the working register AD_SAUT. Thus, the execution of an interrogation instruction clears and replaces the value of the register AD_SAUT updated by the previous interrogation instruction.

If a previous interrogation instruction has updated the register AD_SAUT with the trap address, and if a second interrogation instruction with a different reference code is executed without finding its reference code in the orientation table, it is sufficient, and wise, to clear the preceding value of AD_SAUT, thus cancelling all traps until the next interrogation instruction. However, it is not outside the scope of the invention to retain the previous value, thus maintaining the trap.

A second advantage of using code references "A", "B", etc., written in an orientation table is apparent: this table contains only necessary data, referring only to the desired traps effective in the main program. Thus, at any time, its size is optimized, resulting in an increase in memory space.

Advantageously, it is possible to store code sequences in the main program that are not called by it. With the aid of the device according to the invention, it is possible to associate with each of these sequences a code reference that is stored in the orientation table with the start address of the sequence. Thus, it is possible to activate a "dormant" code in the programmable memory of the portable device.

Figure 7:
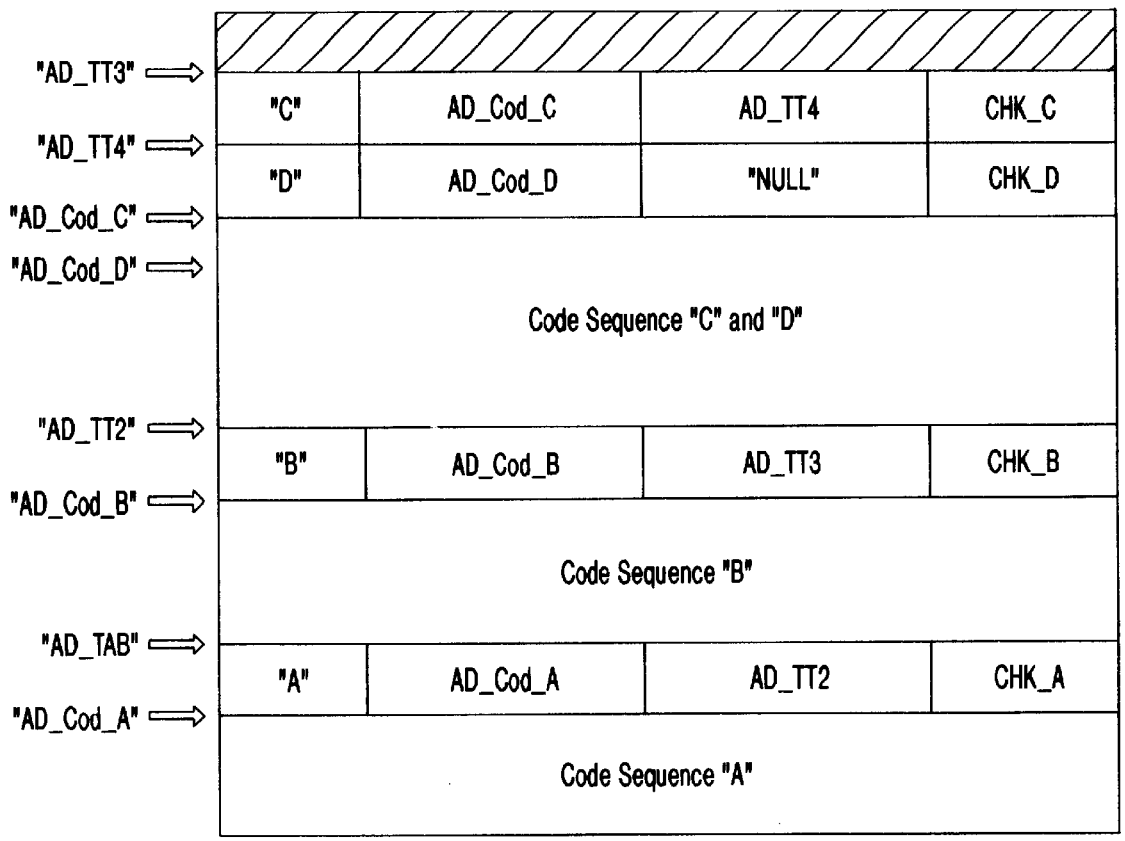
FIG. 7 represents a second exemplary embodiment of the partition of the memory incorporating the orientation table and the code sequence areas.

Advantageously, it is also possible through the orientation instructions to define several entry points to the same code sequence, and to associate them with different reference codes. Likewise, a plurality of sequences "A", "B" and "C", for example, can be grouped into a single sequence written all at once into programmable memory with the reference code "A" and the entry point AD_Cod_A; the other two reference codes and entry points are written subsequently. An example of an orientation table which allows this operation is presented below (FIG. 7).

Figure 5:
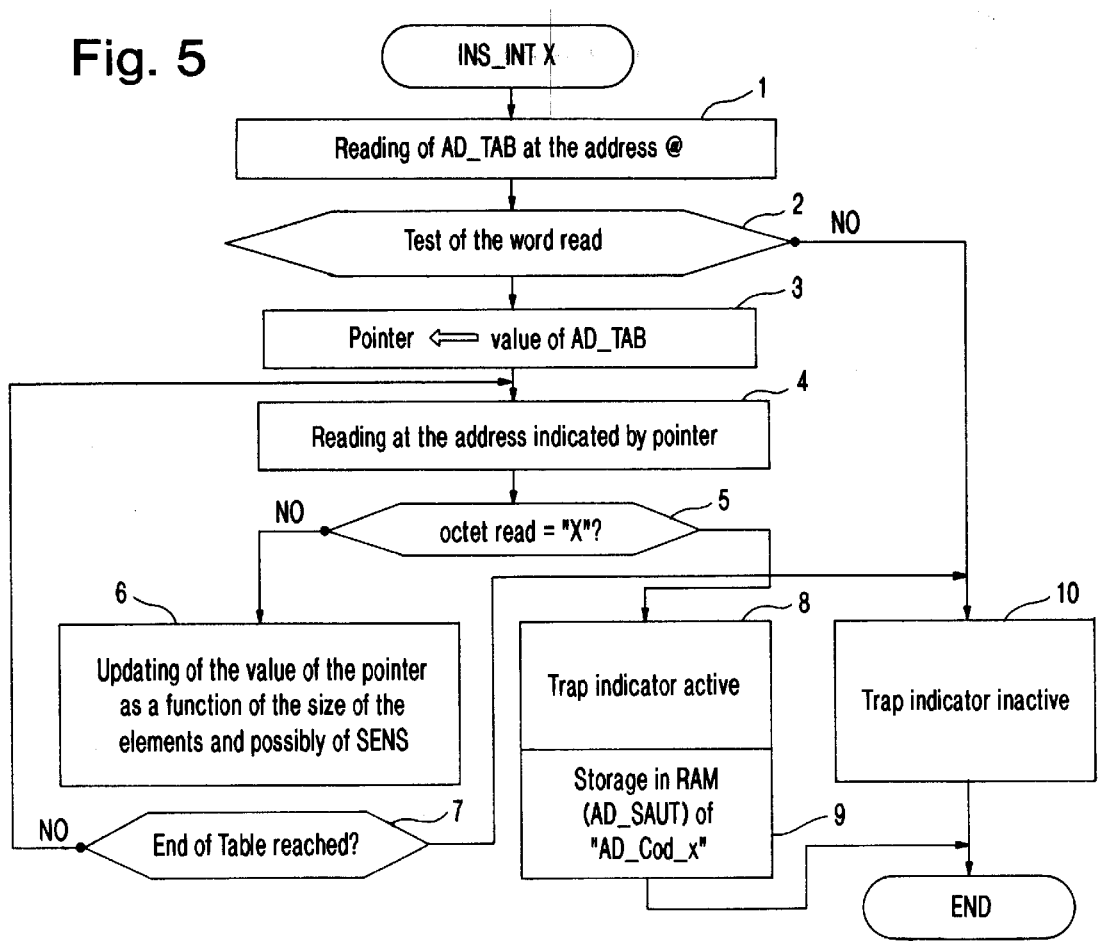
FIG. 5 represents an example of an algorithm for the execution of a code sequence constituting the interrogation instruction.

The execution of the interrogation instructions will now be explained with the aid of FIG. 5. An input parameter of this instruction is the value marked "X" of the reference code corresponding to the code sequence which will be executed during a subsequent orientation instruction; in the example, this value is "X". In step 1, the main program, by executing the interrogation instruction sequence, reads in the system area at the address @, which is known by the program in ROM, the content AD_TAB which is the start address of the orientation table. In step 2, the interrogation instruction sequence tests the word read. If the word read is not significant, the orientation table does not exist, and no trapping of code is possible. The interrogation instruction sequence is terminated and the trap indicator DI is inactive (step 10). If the word read is significant, in step 3 the interrogation instruction sequence updates a pointer, such as for example AD_SAUT, in working memory with the value AD_TAB read. Then in step 4 the interrogation sequence reads an element of the table indicated by this pointer. In step 5 of the interrogation sequence, the value of the field corresponding to the code reference is compared to the value of the reference code "X" provided as an input parameter. If the two values are identical, the interrogation sequence, in step 8, sets the trap indicator DI to the active state. With the aid of the pointer, the interrogation sequence, in step 9, reads the address value "AD_Cod_X" located immediately after the reference code in the orientation table. This value is stored in the register AD_SAUT in working memory RAM. If the two code reference values are not identical, in step 6 the pointer is updated in order to indicate the next reference code in the orientation table. This update is executed, taking into account the size of each element of the table; if for example the table is composed of words of 32 bits, the value of the pointer, which addresses octets (8 bits), is increased by 4. The interrogation sequence, in step 7, tests whether the word of the programmable memory addressed by the pointer is still in the orientation table. This test depends on the organization of the table, several examples of which will be given below. If the word indicated no longer belongs in the table, the interrogation instruction sequence is terminated and the trap indicator DI is set to the inactive state by step 10. If the word indicated is still in the orientation table, the interrogation sequence loops back to step 4.

At the end of the interrogation instruction sequence, the trap indicator DI is always set; if it is active, the value in AD_SAUT is significant. Advantageously, the interrogation instruction sequence can be written by the programmer, who implements the main program like a subroutine having as input parameters the reference code, for example X, to be searched for in the table and possibly a return address, and as an output parameter a trap indicator DI specifying whether the trap must actually be implemented. It is possible during initialization to execute a reading of the orientation table and to store in working memory all the addresses corresponding to the existing reference codes, which avoids having to systematically scan the table at each interrogation instruction, and avoids having to search in vain for a code that does not exist.

Figure 6:
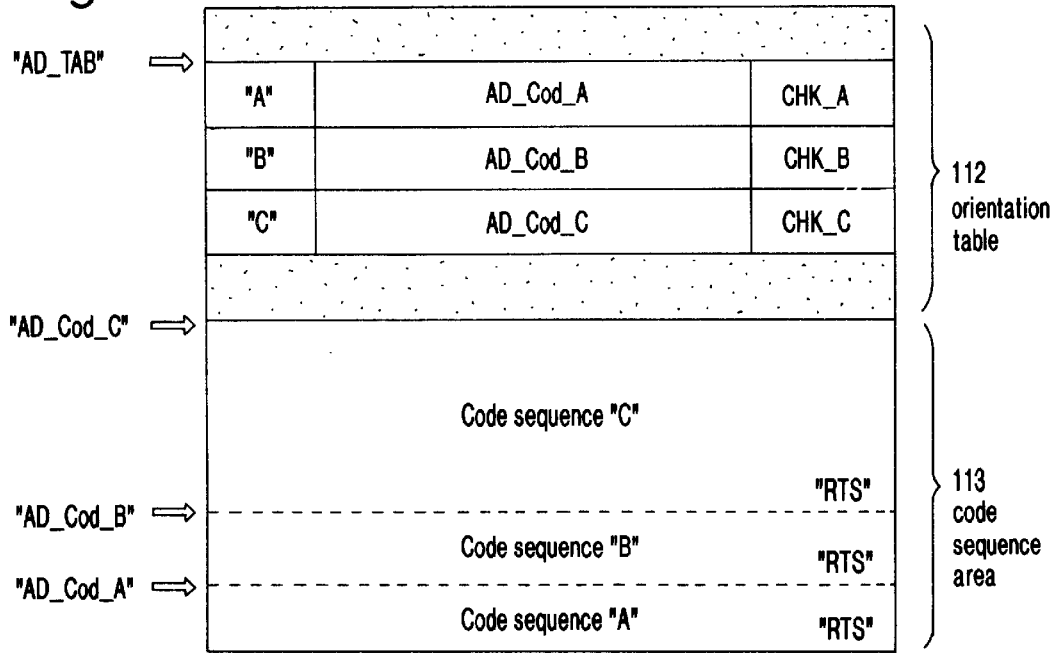
FIG. 6 represents an exemplary configuration of the partition of the programmable memory incorporating the orientation table and the code sequence areas.

FIG. 6 shows an example of an orientation table. This table is composed of orientation words of 32 bits, for example; the first field, for example of one octet, contains the reference code, the second field, for example of two subsequent octets, contains the start address of the code sequence in nonvolatile memory, and the last field, for example of one octet, is optional and can contain a checksum code (CHK_A) which makes it possible to check the integrity of the value of the first two fields and/or of the attached code sequence. In this orientation table, the elements follow one another in contiguous fashion. The end of table is reached when the next word is blank. The value SENS read in the system area indicates the direction of progress of the table pointer, by ascending or descending addresses. In FIG. 6, the direction of the ascending addresses has been chosen.

The format of this table is advantageous when it contains a large number of elements. In effect, the reference codes of these elements can be sorted in a certain order; the organization of these elements in the table can therefore be carried out according to ascending references "A", "B", "C", "D", "E", etc., or descending references "Z", "Y", "X", "W", etc. The size in octets of the table is predetermined. It is either stored in an area (Ta Ta in FIG. 1) of the system area, or determined by pre-reading the table during initialization. During the search for a certain reference code, it is possible to apply sorting algorithms; for example, the pointer is initialized with the address of the element located in the center of the table by adding to the value contained in AD_TAB half the previously determined number of octets in the table, then the reference code read by the pointer is compared to the one to be searched for, and in accordance with the result, the pointer is moved forward or backward, thus pointing to the center of the area remaining to be scanned. This device makes it possible to save time in the search for a code reference in a table. Thus, if the table has n ordered elements, the standard search mode of passing from one element to the next results in the reading, on average, of n/2 elements in order to find the right one. A search like the one indicated above makes it possible to search by reading (log n) elements, which is an advantage when the value n is large.

If, after having scanned the entire table, no value has been read in the table which has the reference "A" sought, no trap of the main program to the code sequence "A" will be executed; in this case, a trap indicator DI in working memory is set to the inactive position.

This format requires the programmer, when writing a code sequence, to arrange the size of the orientation table so as to leave enough memory space after the value of AD_TAB for adding to this table, and possibly for writing other code sequences.

A variant of embodiment of the orientation table can contain only the code reference, and in this case the interrogation instruction program will calculate the jump address by applying an algorithm having the code reference as an input parameter.

FIG. 7 shows another example of an orientation table which avoids the programmer's having to provide in a memory Ta Ta the information corresponding to its size or to carry out a pre-reading of the table in order to determine its size. This table contains orientation words having a field in addition to the three preceding fields: reference code value, start address of the code sequences, and checksum. The additional field, which for example occupies the fourth and fifth octets, contains the address value of the next element in the orientation table. The table is read in the following way: the orientation word corresponding to the first code sequence is located at the address AD_TAB, the reference code is "A", and the sequence starts at the address AD_Cod_A; the next orientation word is located at the address AD_TT2. At this address AD_TT2 is the word corresponding to the second code sequence, which has the reference code "B" and which starts at the address AD_Cod_B. The next word is located at the address AD_TT3, and so on. The end of table is reached when the address value of the next orientation word is for example "NULL". It must be noted that in this example the code sequences labelled "C" and "D" belong to the same block. This block actually has two entry points: AD_Cod_C and AD_Cod_D.

It is entirely possible for one or more code sequences or parts of sequences to be written in the data area of the programmable memory. In this case, it is advisable to input it into an area that is clearly delimited and known as such by the application part of the main program, and possibly, for security reasons, to prevent its being read from the outside.

Figure 8:
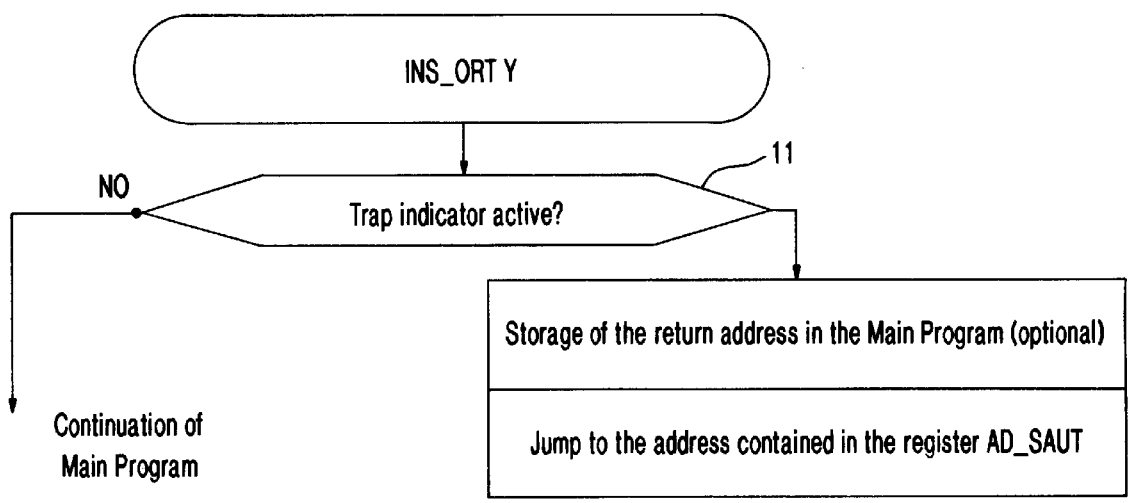
FIG. 8 represents an example of a flow chart of the execution of a code sequence constituting an orientation instruction.

The execution of an orientation instruction sequence will now be explained with the aid of FIG. 8. In step 11, the orientation sequence tests the trap indicator DI. If it is inactive, the main program continues in sequence. If the trap indicator DI is active, the sequence proceeds to step 12, by storing the return address in the main program. This storage is optional since in all cases, it is the sequence which chooses the return address in the main program or elsewhere. If several orientation instruction sequences can call the same code sequence, it is advantageous to store the return address specific to each orientation instruction sequence, so as to be able to return to the vicinity of the instruction which caused the trap, which storage can take place in a working register AD_RET or in the stack; in the latter case, the code sequence stored in the programmable memory is considered to be a subroutine which ends with a specific "return to subroutine" ("RTS") code. Then in step 13 the orientation sequence ends with a jump to the code sequence starting at the address stored in the register of the working memory AD_SAUT by a previous interrogation sequence.

The writing of new code sequences and the updating of the orientation table will now be explained.

Figure 9:
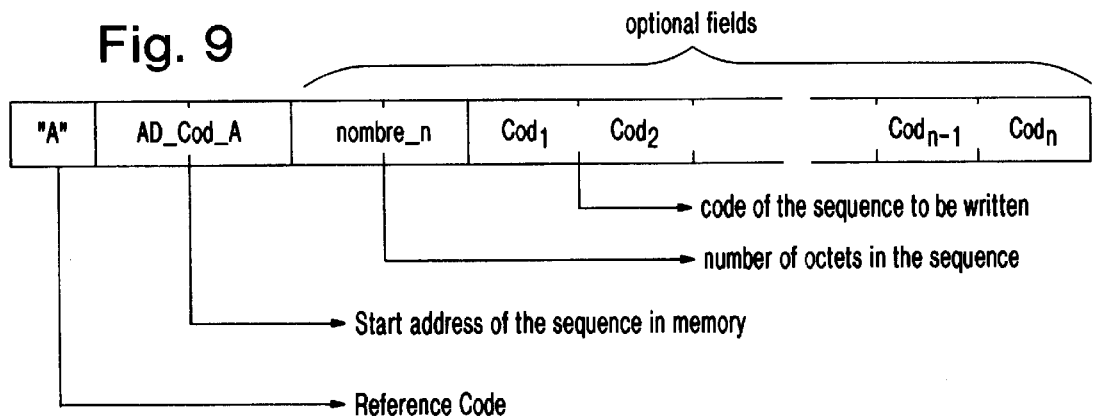
FIG. 9 represents an example of the fields constituting a write instruction of a sequence.

A code sequence write command ECR_SEQ_E is sent from the outside through the input-output device (13) to the card. The data of this command is broken down into a plurality of fields, as shown in FIG. 9. The command ECR_SEQ_E comprises:

in a first field, the reference code: "A", "B", etc., in a second field, the start address of the sequence, in a third optional field, the size of the sequence, that is, the number of octets to be written, and in a fourth optional field, the sequence, that is the octets to be written.

The third and fourth fields are unnecessary when the code sequence has already been written in nonvolatile memory (FRAM, EPROM, EEPROM or ROM).

Figure 10:
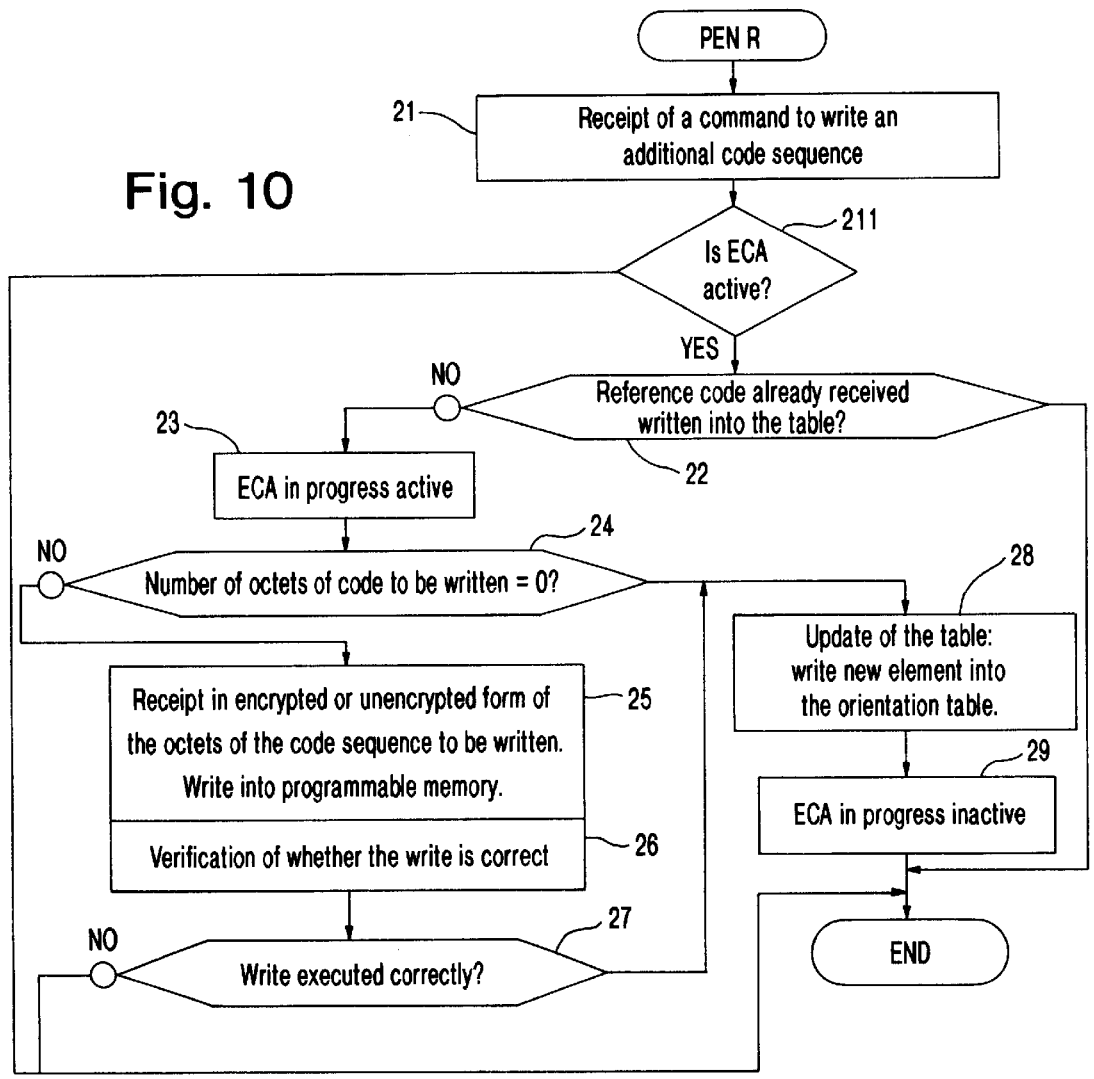
FIG. 10 represents the flow chart of the execution of a recording sequence triggered by a write instruction.

FIG. 10 shows a flow chart illustrating the running of the program PENR which executes the instruction ECR_SEQ_E for writing a new sequence E. In step 21, the command is sent to the card and the first two fields of the command are analyzed. Once the type of instruction sent to the card is recognized by the latter, the write control program can verify whether the value in AD_TAB is consistent; if it is not, the orientation table is not operational, so it is not possible to write a new code sequence and the command is interrupted.

In step 211, if a flag ECA is inactive, the program proceeds to the next step; if not, the execution of the program is interrupted.

In step 22, the write control program checks to see whether an identical reference has already been written. If the table already contains a code reference identical to the one received, the command is interrupted. This check, which is unique to the present invention, offers a real advantage over the prior art described above, since it makes it impossible to write two code sequences with the same reference by mistake. In step 23, the write control program renders the flag ECA_in_progress (Writing of Additional Code in progress) active in nonvolatile memory, thus indicating that the writing of a new sequence is in progress. Next, in step 24, the program PENR tests the number of octets of code to be written. If this number is null, there is no new code sequence to be written and only a new code reference is to be added to the table; this is the case when activating a "dormant" code in ROM or when adding an entry point to a code sequence already written in programmable memory.

If the number of octets of code to be written is not null, the card is placed in the receive mode, in step 25. The octets are received, possibly decrypted and/or signed if that mode has been chosen, then written thereafter at the start address of the sequence defined in the second field of the command ECR_SEQ_E. In all cases, the write address must be blank, otherwise the command is interrupted, leaving the flag ECA_in_progress active, which has the effect of definitively blocking the card, except for the regeneration mechanism defined below. Once all the octets of code have been received and the corresponding sequence has been written, the program (PENR) verifies in step 26 whether the write has been executed correctly. One way to do this is to generate a checksum or a signature from the value of the octets written and their addresses. In step 27, the program (PENR) tests the validity of the code written. If the write has not been executed correctly, the command is interrupted, leaving the flag ECA_in_progress active.

If the write has been executed correctly, or if there is no code sequence to be written, in step 28 the program PENR updates the orientation table by writing the new orientation word. In the schema of the table described by FIG. 6, the new orientation word is written immediately after the last word. The program PENR determines the last element by scanning the table, starting at the address AD_TAB and proceeding in the direction indicated in SENS. The checksum written in the third field of the orientation word can either be sent from the outside or calculated by the card. This checksum can be a simple sum or exclusive OR (XOR) of the octets or can be cryptographic, and it can be a function of the word of the table or can include the code sequence attached to this word. In the schema of the table described by FIG. 7, the new word is written in a blank space in the area of the sequences and orientation words of the table. The program PENR must also modify the third field of the second-to-last field of the table so that it contains the address AD_Cod_E of this new code sequence "E".

When all these operations have been executed correctly, in step 29 of the program PENR the flag ECA_in_progress is rendered inactive, the chief result of which is to validate the orientation table and the sequences. If the command has not been correctly executed, an error message sent by the program PENR to the outside informs the user of the type of error.

It is necessary to indicate the specific case in order to write the contents of AD_TAB and possibly of SENS. In effect, the preceding description is only valid for an orientation table that is already started. It will be recalled that AD_TAB contains the start address of the orientation table and that if the latter is organized as described in FIG. 6, the field SENS indicates the direction in which this table is scanned.

Using the data format described in FIG. 9, it is possible to dedicate a specific code reference for writing the contents of AD_TAB and possibly of SENS. As seen in FIG. 9, for this particular reference, the field AD_Cod_A will not be significant, while the field containing the code of the sequence will contain the contents to be loaded into AD_TAB and possibly SENS.

Another way to do this, which is valid for writing any data element (code sequences, elements of the orientation table, etc.) is to use the following format:

| Start address of write | Number of octets | Data |

This method offers the main advantage of allowing any data element to be written by the developer of the additional code.

To identify an operating system, or some of its characteristics such as the utilization of an additional code, it suffices to send identification octets through the card when the card is powered up. The power up operation which must occur before it is possible to dialogue with a card. Internally, the operating system can build its response to the reset by analyzing the pointer AD_SAUT of the orientation table and the table itself.

A code sequence invalidation instruction INS_INA_C sent from outside the card through its processing program (PINA) exists for the purpose of inactivating a trap corresponding to a certain reference code, for example C. A first way to do this is comprised of deleting all the data related to this code—the element in the orientation table and the entire corresponding sequence—then updating the orientation table. A second, faster way is comprised of changing, in the orientation table, the reference code which corresponds to the code sequence to be invalidated by another value, for example "NULL", in which case the code will no longer exist and no interrogation instruction will be able to update the working memory AD_SAUT in order to execute this sequence. Finally, a last way is comprised of replacing the address value in the orientation table with an impossible address value, for example "NULL", or to direct the calling program to a simple code sequence which "returns control." This last way is well adapted to code sequences written in ROM, wherein this "dormant" code can be very easily activated and deactivated.

A regenerating write INS_REG coming from outside the card, through its processing program PREG, exists for the purpose of deleting one or more code sequences and/or table elements or, in a general way, a data set. Several methods are possible: the start and end addresses of a memory space are sent to the card and all the octets of this space are deleted. This somewhat "rough" method must be used with caution in order not to render inoperative the sequences which must not be deleted. Another method is comprised of indicating to the card the reference codes to be deleted as well as the corresponding code sequences in programmable memory, if any exist; after a command of this type, the program must determine the address of the corresponding table elements, then delete these elements and determine the start and end addresses of the code sequences and finally delete the contents. The method for searching for these addresses and updating the table is highly dependent on the structure of the orientation table, as seen in FIGS. 6 and 7. The method does not pose any problem for one skilled in the art and therefore does not need to be explained.

A final command REC_ESP_VRG, which can facilitate the updating of the table and the code sequences, is "Search Blank Space". Sent to the card without any particular data element, this command makes it possible to send to the outside, through the program PREV for processing this command, the blank spaces of the programmable memory (11) with the start and end addresses of each of these spaces. The user who wishes to add code sequences can, as a result of this command, verify whether the space available is sufficient and define the code sequence as a function of its storage address.

In a variant of embodiment which makes it possible to check the integrity of the additional code sequence, just before executing the jump in the orientation instruction sequence, it is necessary to provide two additional fields in each element of the orientation table: a first additional field, which indicates the size of the additional code sequence attached to the element, and a second additional field containing the initial correct checksum.

If the checksum calculated differs from the initial one, the operating system stops the execution by sending an appropriate status word. This method offers the advantage of performing a check before each execution of a new code sequence, but it increases the execution time of the command in question; it can be limited to performing this check only during the first execution.

The second method is comprised of providing a dedicated command which calculates the checksum of an area of programmable memory and compares the value calculated with the one provided or written previously in the field CHK_X. Thus, the manager of the system can periodically activate this command in order to make sure that everything is okay.

An operating system which supports the device for writing and executing additional code can be restricted in order to reduce its capacities by means of inhibiting locks in programmable memory such as:

CAI: Additional Code Inhibited, which will be tested by the operating system before any write.

RCI: Card Regenerate Inhibited, which will be tested by the operating system before any regeneration.

These locks are similar, in terms of their management, to the locks for managing the life cycles of the operating systems of the cards.

One utilization of this capability is comprised of loading additional code into EEPROM (11), then setting the inhibiting locks RCI and CAI so as to freeze the added code.

Of course, the invention is not limited to the exemplary embodiment described above but on the contrary comprises all means constituting technical equivalents of the means specifically described as well as all combinations of same, if executed in the spirit of the invention and implemented within the scope of the following claims.

What is claimed is:

1. A device for executing code including a plurality of executable instructions of a code comprising:

a processor for executing instructions, a non-programmable memory for storing information, and a programmable memory for storing information, said code being stored in said non-programmable memory and including a code sequence and at least one code sequence reference able to provide access to said code sequence, said at least one code sequence reference disposed at a respective specific location among said plurality of executable instructions of said code, said code sequence including at least one instruction to be executed and which is arranged to be executed by said processor at said respective specific location in addition to said code, said code sequence being stored in one of said non-programmable memory and said programmable memory, means for defining in said programmable memory a zone of variable size dedicated for storing only those code sequence references of said locations where access to code sequences is required;

means for adapting the size of said zone to the number of code sequence references stored therein, and means for searching, when the processor executes said code and encounters said at least one code sequence reference at one of said locations, for said code sequence reference in said zone and, if found, for executing a jump from said code to said code sequence for executing the instructions of said code sequence, then for executing remaining instructions of said code.

2. The device according to claim 1, further comprising an address data element associated with said code sequence and defining a code sequence location in one of said non-programmable memory and said programmable memory, said address data element being calculated from the code sequence reference.

3. The device according to claim 1, wherein said zone contains an address data element associated with the executed code sequence and defining said executed code sequence location in said non-programmable memory and said programmable memory.

4. The device according to claim 1, further comprising, in a protected area of the programmable memory (11), a data element (AD_TAB) defining a first address and a search direction (SENS) in order that the processor reads the programmable memory means."

5. The device according to claim 1, wherein said zone comprises an additional field (AD_TT) indicating the next address in the zone where information corresponding to the next code reference is located.

6. The device according to claim 1, wherein said zone comprises an additional field (CHK) adapted to verify the integrity of the code sequence and any information associated therewith in comparison with a result supplied by a check sum calculator.

7. The device according to claim 1, further comprising means for storing in the programmable memory an address to return to after a jump when several jumps are directed to the same code sequence address.

8. A device according to claim 1 further comprising:

a trap indicator;

first means for verifying the presence of said code sequence reference, storing in a working memory an address data element associated with the code sequence reference, and setting said trap indicator indicating that said jump is to be executed; and second means for testing if the trap indicator is set and, if set, executing a jump to the address indicated by the stored address data element.

9. The device according to claim 1, wherein said zone comprises an additional field (CHK) adapted to verify the integrity of the code sequence or any information associated therewith in comparison with a result supplied by a check sum calculator.

10. A process for writing a new code sequence in a device comprising a processing means for executing code instructions, a non-programmable memory means and a programmable memory means, wherein said non-programmable memory means contains a code including a plurality of instructions and at least one code sequence reference, and said programmable memory means contains an orientation table comprising a field for storing at least one code sequence reference linked with a code sequence, wherein said linkage enables a code jump from said code to said code sequence, said code sequence being stored in one of said non-programmable memory means and programmable memory means, the process comprising the steps of receiving a write command, verifying the presence in the write command of a first field constituting the code reference and a second field representing the address of the code sequence in the non-programmable memory means;

verifying that a predetermined flag is active;

checking that the code sequence reference supplied by the first field does not exist in the orientation table;

setting the flag to an active state;

receiving and writing in the non-programmable memory means information associated with the new code sequence, including updating said orientation table;

setting the flag to the inactive state; and stopping the process when said flag is inactive or the code sequence reference exists in the orientation table before writing.

11. A method for storing a code comprising a plurality of instructions to be executed in a device comprising a processor for executing instructions, a non-programmable memory for storing information, and a programmable memory for storing information, the method comprising the steps of:

inserting at specific locations among said instructions of said code at least one code sequence reference able to provide access to a code sequence comprising at least one instruction to be executed and which is arranged to be executed by said processor at a respective one of said specific locations in addition to said code, said code sequence being stored in one of said non-programmable memory and said programmable memory;

storing said code including said at least one code sequence reference in said non-programmable memory;

defining in said programmable memory a zone of variable size dedicated for storing at least one of said code sequence references;

storing in said zone only those code sequence references of said locations where access to code sequences is required; and adapting the size of said zone to the number of code sequence references stored therein, so that said processor, when executing said code and encountering a code sequence reference at one of said locations, will search for said code sequence reference in said zone and, if found, will execute a jump from said code to said code sequence for executing the instructions of said code sequence, and then will execute remaining instructions of said code.

* * * * *